(12) United States Patent
Ochiiwa et al.

(10) Patent No.: US 11,673,304 B2
(45) Date of Patent: Jun. 13, 2023

(54) ELECTRIC INJECTION MOLDING MACHINE

(71) Applicant: THE JAPAN STEEL WORKS, LTD., Tokyo (JP)

(72) Inventors: Takashi Ochiiwa, Hiroshima (JP); Daisuke Toyota, Hiroshima (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 167 days.

(21) Appl. No.: 16/968,156

(22) PCT Filed: Jan. 25, 2019

(86) PCT No.: PCT/JP2019/002409
§ 371 (c)(1),
(2) Date: Aug. 6, 2020

(87) PCT Pub. No.: WO2019/167494
PCT Pub. Date: Sep. 6, 2019

(65) Prior Publication Data
US 2020/0361129 A1    Nov. 19, 2020

(30) Foreign Application Priority Data
Feb. 28, 2018    (JP) .............................. JP2018-034582

(51) Int. Cl.
*B29C 45/50* (2006.01)
*B29C 45/76* (2006.01)
(Continued)

(52) U.S. Cl.
CPC ...... *B29C 45/5008* (2013.01); *B29C 45/5092* (2013.01); *B29C 45/7666* (2013.01); (Continued)

(58) Field of Classification Search
CPC ............ B29C 45/5008; B29C 45/5092; B29C 45/7666; B29C 2045/504;
(Continued)

(56) References Cited

U.S. PATENT DOCUMENTS

2007/0009630 A1    1/2007 Okada
2012/0009297 A1*   1/2012 Ochi ................... B29C 45/7666
                                                              425/556
2014/0055069 A1    2/2014 Dai et al.

FOREIGN PATENT DOCUMENTS

JP    2007-537061 A    12/2007
JP    2008-094035 A     4/2008
(Continued)

OTHER PUBLICATIONS

International Search Report from International Patent Application No. PCT/JP2019/002409, dated Apr. 2, 2019.

*Primary Examiner* — S. Behrooz Ghorishi
(74) *Attorney, Agent, or Firm* — Potomac Law Group, PLLC

(57) ABSTRACT

An electric injection molding machine includes an injection apparatus including a screw configured to inject a resin, a driving direction conversion part configured to move the injection apparatus forward and backward in an axial direction of the screw, and a first motor coaxially connected to a rotation shaft of the driving direction conversion part, the first motor being configured to drive the driving direction conversion part. The first motor includes a motor connection part, the motor connection part being configured to connect a second motor to the first motor coaxially with the driving direction conversion part on a side of the first motor opposite to a side thereof on which the driving direction conversion part is connected thereto, the second motor being configured (Continued)

to drive the driving direction conversion part in an interlocking manner with the first motor.

4 Claims, 8 Drawing Sheets

(51) Int. Cl.
*H02K 11/21* (2016.01)
*H02K 1/278* (2022.01)
*H02K 21/16* (2006.01)

(52) U.S. Cl.
CPC .................. *B29C 2045/504* (2013.01); *B29C 2945/76214* (2013.01); *B29C 2945/76381* (2013.01); *B29C 2945/76692* (2013.01); *B29C 2945/76859* (2013.01); *H02K 1/278* (2013.01); *H02K 11/21* (2016.01); *H02K 21/16* (2013.01)

(58) Field of Classification Search
CPC .......... B29C 2945/76214; B29C 2945/76381; B29C 2945/76692; B29C 2945/76859; B29C 45/50; B29C 45/03; B29C 45/76; B29C 2045/5024; B29C 2045/5028; H02K 1/278; H02K 11/21; H02K 21/16; H02K 7/003; H02K 7/14; H02K 16/00
See application file for complete search history.

(56) References Cited

FOREIGN PATENT DOCUMENTS

| | | | |
|---|---|---|---|
| JP | 2008094035 A | * | 4/2008 |
| JP | 2009-039900 A | | 2/2009 |
| JP | 2012-091371 A | | 5/2012 |
| JP | 2014-509826 A | | 4/2014 |
| WO | WO 2005/037519 A1 | | 4/2005 |
| WO | WO-2005110708 A1 | * | 11/2005 ......... B29C 45/5008 |

* cited by examiner

ELECTRIC INJECTION MOLDING MACHINE

TECHNICAL FIELD

The present invention relates to an electric injection molding machine.

BACKGROUND ART

In recent years, there has been a demand for improving the capability of electric injection molding machines to mold thin-walled molded articles. To meet this demand, an electric injection molding machine is required to inject a resin into a mold at a high speed. One of the techniques for injecting a resin into a mold at a high speed is, for example, to develop a motor that rotates with a high torque and a low inertia. Such a motor can contribute to moving a screw for injecting a resin at a high acceleration and a high speed. Various proposals have been made for such motor techniques.

An electric injection molding machine disclosed in Patent Literature 1 includes an injection apparatus equipped with a screw, a mold clamping apparatus equipped with a movable platen, and an ejector apparatus equipped with an ejector pin. The characteristic feature of this electric injection molding machine is that, in at least one of electric motors therein, the ratio of the stacking length of the magnet of the rotor to the inner diameter of the stator is three or larger.

Patent Literature 2 discloses a reluctance motor in which three motors use one common rotation shaft.

CITATION LIST

Patent Literature

Patent Literature 1: International Patent Publication No. WO2005/037519
Patent Literature 2: Published Japanese Translation of PCT International Publication for Patent Application, No. 2014-509826

SUMMARY OF INVENTION

Technical Problem

In the electric injection molding machine disclosed in Patent Literature 1, since at least one motor has a large length, the machining of the rotor, the stator, and each of other components thereof needs to be highly accurate, thus possibly increasing the manufacturing cost. Meanwhile, the reluctance motor disclosed in Patent Literature 2 uses the one common rotation shaft, so that the degree of flexibility in design is low. Therefore, it is desired to develop a motor capable of moving a screw at a high acceleration and a high speed without being subjected to the above-described constraint in design.

Other problems to be solved and novel features will become apparent from descriptions in this specification and accompanying drawings.

Solution to Problem

A first exemplary aspect is an electric injection molding machine including: an injection apparatus including a screw configured to inject a resin; a driving direction conversion part configured to move the injection apparatus forward and backward in an axial direction of the screw; and a first motor coaxially connected to a rotation shaft of the driving direction conversion part, the first motor being configured to drive the driving direction conversion part. Further, the first motor includes a motor connection part, the motor connection part being configured to connect a second motor to the first motor coaxially with the driving direction conversion part on a side of the first motor opposite to a side thereof on which the driving direction conversion part is connected thereto, the second motor being configured to drive the driving direction conversion part in an interlocking manner with the first motor.

Further, another exemplary aspect is an electric injection molding machine including: an injection apparatus including a screw configured to inject a resin; a driving direction conversion part configured to move the injection apparatus forward and backward in an axial direction of the screw; and a driving apparatus configured to drive the driving direction conversion part. Further, the driving apparatus includes a plurality of motors. A rotor of each of the plurality of motors is coaxially connected to a rotation shaft of the driving direction conversion part, and the plurality of motors drive the driving direction conversion part in an interlocking manner.

Advantageous Effects of Invention

According to an embodiment, it is possible to provide an electric injection molding machine including a motor having a high degree of flexibility in design, and having a high torque and a low inertia.

DESCRIPTION OF EMBODIMENTS

Embodiments are explained hereinafter with reference to the drawings. It should be noted that the drawings are made in a simplified manner, and therefore the technical scope of the embodiments should not be narrowly interpreted based on those drawings. Further, the same components are assigned the same symbols and their duplicated explanations are omitted.

In the following embodiments, when necessary, the present invention is explained by using separate sections or separate embodiments. However, those embodiments are not unrelated with each other, unless otherwise specified. That is, they are related in such a manner that one embodiment is a modified example, an application example, a detailed example, or a supplementary example of a unit or the whole of another embodiment. Further, in the following embodiments, when the number of elements or the like (including numbers, values, quantities, ranges, and the like) is mentioned, the number is not limited to that specific number except for cases where the number is explicitly specified or the number is obviously limited to a specific number based on its principle. That is, a larger number or a smaller number than the specific number may be also used.

Further, in the following embodiments, their components (including operation steps and the like) are not necessarily indispensable except for cases where the component is explicitly specified or the component is obviously indispensable based on its principle. Similarly, in the following embodiments, when a shape, a position relation, or the like of a component(s) or the like is mentioned, shapes or the likes that are substantially similar to or resemble that shape are also included in that shape except for cases where it is explicitly specified or they are eliminated based on its principle. This is also true for the above-described numbers or the like (including numbers, values, quantities, ranges, and the like).

First Embodiment

A first embodiment will be described hereinafter with reference to the drawings.

Figure 1:
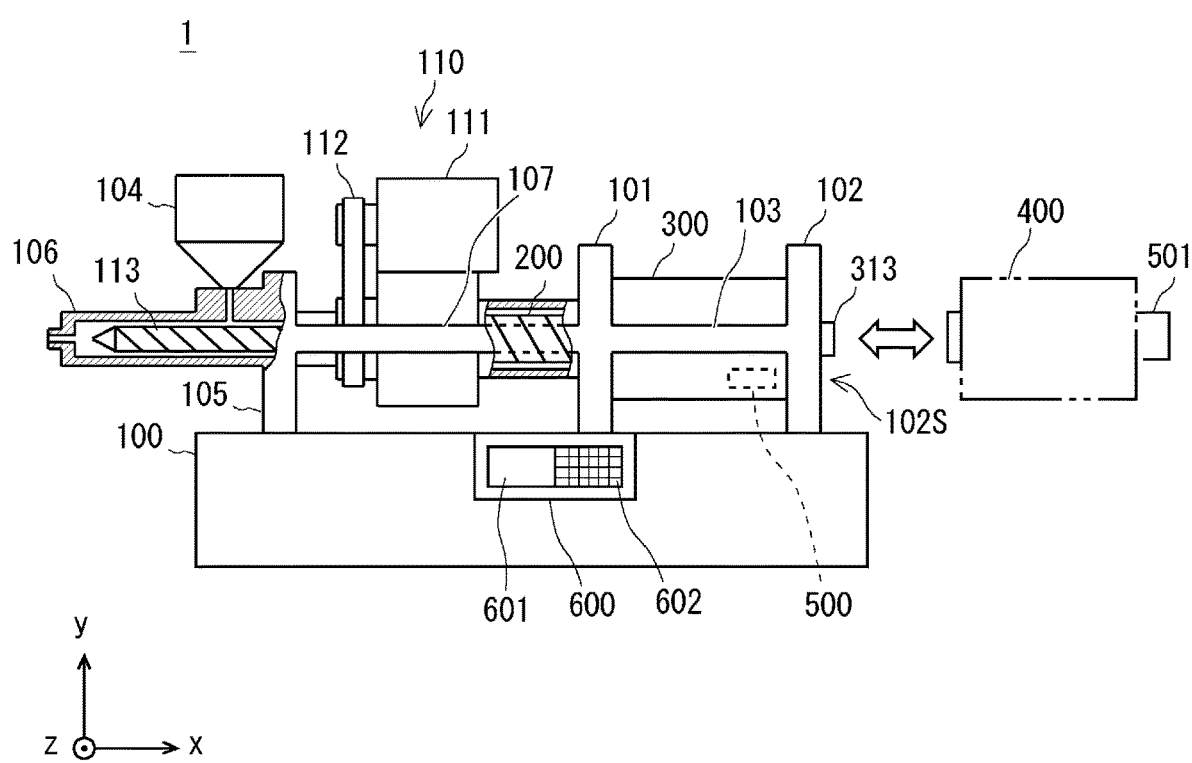
FIG. 1 shows an overall view of an electric injection molding machine according to a first embodiment.

FIG. 1 is an overall view of an electric injection molding machine according to the first embodiment. Note that for the sake of explanation, some of the components of the electric injection molding machine 1 are shown in cross section in FIG. 1. Further, for easier understanding, a right-hand xyz-coordinate system is shown in FIG. 1. The right direction in the drawing corresponds to an x-axis positive direction in the coordinate system. The upward direction in the drawing corresponds to a y-axis positive direction. Further, the direction that is perpendicular to the paper and extends from the rear side of the paper toward the front side thereof corresponds to a z-axis positive direction.

The electric injection molding machine 1 shown in FIG. 1 plasticizes resin pellets and injects the plasticized resin into a mold. The electric injection molding machine 1 has a mechanism in which a first motor 300 that drives a ball screw 200 is coaxially disposed with the ball screw 200, and the first motor 300 directly drives the ball screw 200. Further, the electric injection molding machine 1 has a structure by which a second motor 400 can be connected to the first motor 300. The electric injection molding machine 1 mainly includes a base 100, an injection apparatus 110, the ball screw 200, the first motor 300, an encoder 500, and a control apparatus 600.

The base 100 is a framework composed of a plurality of metal plates, metal bars, and the like. A first fixing plate 101, a second fixing plate 102, and an injection apparatus supporting part 105 are vertically disposed above the upper surface (a surface on the y-axis positive side) of the base 100. These structures, which are vertically disposed above the base 100, are supported by the base 100.

The first fixing plate 101 is a structure for fixing the first motor 300. The first motor 300 is fixed to the first fixing plate 101 by a fastening member such as bolts. The first fixing plate 101 is composed of a member capable of suppressing vibrations and the like of the motor. This member is made of, for example, iron or a metal containing iron as the main component. The first fixing plate 101 has a surface that is opposed to the second fixing plate 102, and a beam member 103 is perpendicularly disposed in this surface. Further, the first fixing plate 101 has a surface that is opposed to the injection apparatus supporting part 105, and a guide member 107 is perpendicularly disposed in this surface.

The second fixing plate 102 is a structure for fixing the second motor 400 which is connected to the first motor 300. The second fixing plate 102 is vertically disposed at a place where the second motor 400 can be connected to the first motor 300. That is, in FIG. 1, along the x-axis positive direction, the first fixing plate 101, the first motor 300, and the second fixing plate 102 are arranged in this order. The second fixing plate 102 can fix the second motor 400 to a surface 102S of the second fixing plate 102 opposite to the surface thereof that is opposed to the first motor 300. Similarly to the first fixing plate 101, the second fixing plate 102 is composed of a member capable of suppressing vibrations and the like of the motor. Further, the beam member 103 is perpendicularly disposed on the surface of the second fixing plate 102 that is opposed to the first fixing plate 101.

The injection apparatus supporting part 105 is a structure for supporting a cylinder 106 and the injection apparatus 110. A hopper 104 is mounted above the cylinder 106, so that the cylinder 106 receives resin pellets from the hopper 104 and supplies the received resin pellets into the inside thereof. Further, the injection apparatus supporting part 105 has a surface that is opposed to the first fixing plate 101, and the guide member 107 is perpendicular disposed in this surface. The guide member 107 is a structure for bridging (i.e., bridging the gap between) the first fixing plate 101 and the injection apparatus supporting part 105, and extends in the x-axis direction. Further, the guide member 107 includes a linear guide(s). This linear guide(s) is engaged with the injection apparatus 110, and thereby supports the injection apparatus 110 so that it can be moved forward and backward in the x-axis direction.

The injection apparatus 110 plasticizes a resin and injects the plasticized resin into a mold. The injection apparatus 110 includes a plasticizing motor 111. Power generated by the plasticizing motor 111 is transmitted to a screw 113 disposed inside the cylinder 106 through a belt 112. The screw 113 facilitates (or accelerates) the plasticization of the resin and pushes out the plasticized resin into the mold. In FIG. 1, the screw 113 is disposed so that its axial direction is in parallel with the x-axis, and the injection apparatus 110 moves forward and backward along the x-axis. The injection apparatus 110 is connected to the ball screw 200, and supported by the linear guide(s) provided in the guide member 107 so that the injection apparatus 110 can be moved forward and backward in the x-axis direction.

The ball screw 200 is a ball screw having a rotation axis extending in a direction parallel to the x-axis. Further, the x-axis positive side of the ball screw 200 is connected to the first motor 300 and the x-axis negative side thereof is connected to the injection apparatus 110. The ball screw 200 receives a driving force in a rotating direction from the first motor 300, converts the received driving force in the rotating direction into a driving force in a linear direction, and moves the injection apparatus 110 forward and backward in the axial direction of the screw 113 by the converted driving force. That is, the ball screw 200 can be regarded as a driving direction conversion part having a mechanism for changing a driving direction.

The first motor 300 is a motor that is coaxially connected to the rotation shaft of the ball screw 200 and drives the ball screw 200. The first motor 300 is fixed by the first fixing plate 101. The first motor 300 includes a motor connection part 313 on a side of the first motor 300 opposite to the side thereof on which the ball screw 200 is connected thereto. The motor connection part 313 can be connected to the second motor 400 which is fixed to the second fixing plate 102. The second motor 400 can be fixed to the surface 102S of the second fixing plate 102. Further, the surface 102S has a structure by which the second motor 400 can come into contact with the motor connection part 313 of the first motor 300. By the above-described structure, in the electric injection molding machine 1 according to the embodiment, the second motor 400 can be connected to the first motor 300 which drives the ball screw 200. Further, in the electric injection molding machine 1 according to the embodiment, it is possible to drive the ball screw 200 by operating the first motor 300 and the second motor 400, which is connected to the first motor 300, in an interlocking manner.

The first motor 300 includes the encoder 500. The encoder 500 is an apparatus that detects a rotation speed of the first motor 300. The encoder 500 is, for example, a rotary encoder including a light emitting element and a light receiving element, or one composed of a magnetic sensor using a Hall element, a coil, or the like. Note that the second motor 400 may also include an encoder 501. When the second motor 400 is connected to the first motor 300, the encoder 501 may provide a signal relating to the number of revolutions (e.g., revolutions per minute) of the second motor 400 acquired by the encoder 501 to the electric injection molding machine 1.

The control apparatus 600 is an apparatus that controls the operations of the motors included in the electric injection molding machine, and includes a substrate, a circuit, a microcomputer, and so on. The control apparatus 600 includes a display unit 601 and an operation unit 602 which serve as an interface with a user. The control apparatus 600 may be disposed at an arbitrary place in the electric injection molding machine 1.

Figure 2:
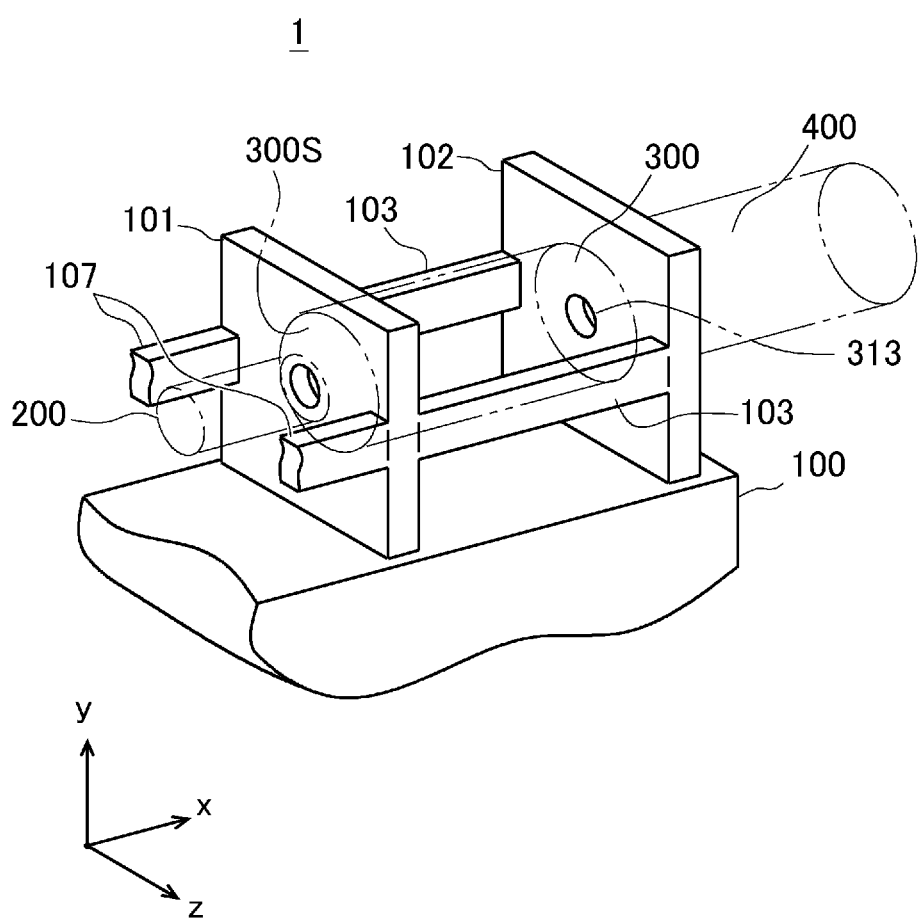
FIG. 2 is a perspective view of a fixing plate of an electric injection molding machine according to the first embodiment.

Next, the configuration of the first and second fixing plates 101 and 102 of the electric injection molding machine 1 will be described with reference to FIG. 2. FIG. 2 is a perspective view of the fixing plates of the electric injection molding machine according to the first embodiment. FIG. 2 shows an imaginary state in which a part of the electric injection molding machine 1 is cut out therefrom, and the ball screw 200, the first motor 300, and the second motor 400 connected thereto are shown by phantom lines.

As shown in FIG. 2, the electric injection molding machine 1 includes the first fixing plate 101 that fixes a surface 300S of the first motor 300, in which (i.e., in the surface 300S) a connection part that connects to the ball screw 200 is provided. Further, the electric injection molding machine 1 includes the second fixing plate 102 that fixes the second motor 400 on the side of the first motor 300 on which the motor connection part 313 is provided.

The electric injection molding machine 1 includes the beam member 103 that bridges (i.e., bridges the gap between) the first and second fixing plates 101 and 102. The beam member 103 extends in the x-axis direction so as to connect the first fixing plate 101 with the second fixing plate 102. In particular, the electric injection molding machine 1 includes two beam members 103 arranged in the z-axis direction. Further, the guide member 107 is perpendicularly disposed on the x-axis negative side of the first fixing plate 101 and extends along the x-axis direction. Similarly to the beam member 103, two guide members 107 are arranged in the z-axis direction. The guide members 107 extend in the x-axis direction and are connected to the injection apparatus supporting part 105. By connecting the guide members 107 to the first fixing plate 101 and the injection apparatus supporting part 105, the rigidity of the framework supporting the injection apparatus 110 and the first motor 300 is improved in the electric injection molding machine 1.

By the above-described configuration, in the electric injection molding machine 1 according to the embodiment, it is possible to make the first and second fixing plates 101 and 102 improve their rigidity each other, and to suppress the vibrations caused by the motor. Note that all of the first fixing plate 101, the second fixing plate 102, and the beam member 103 may be formed of one integrated component, or may be formed by combining (assembling) a plurality of members.

Figure 3:
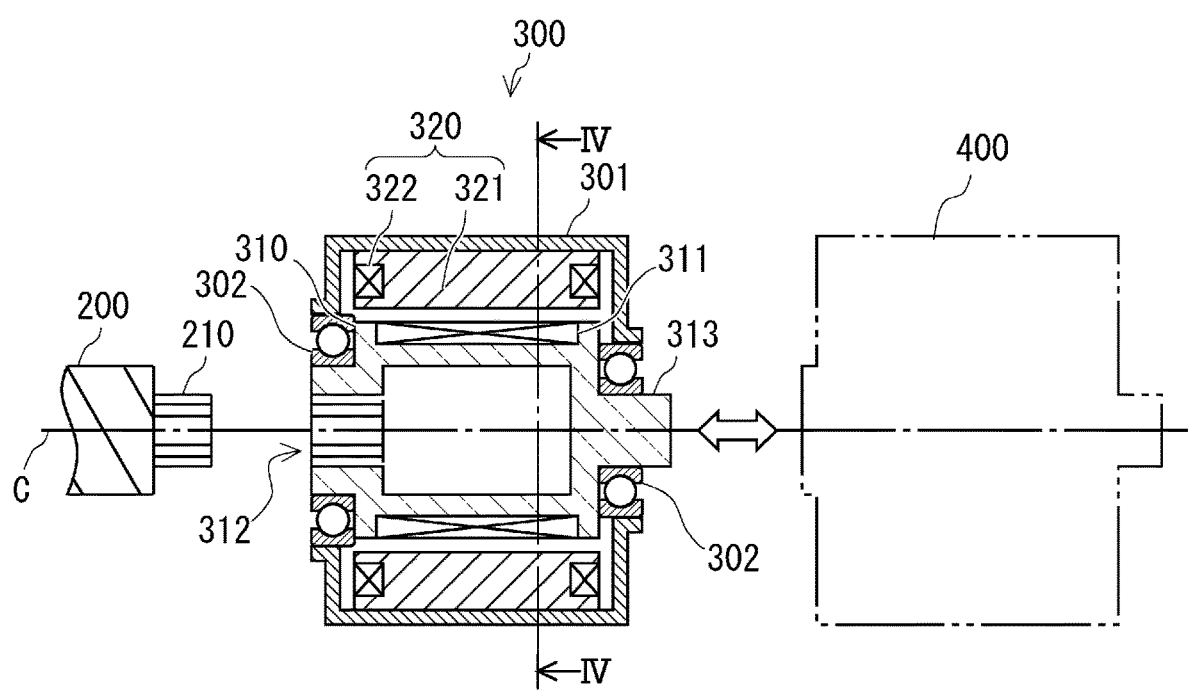
FIG. 3 is a drawing for explaining a configuration of a motor according to the first embodiment.
Figure 4:
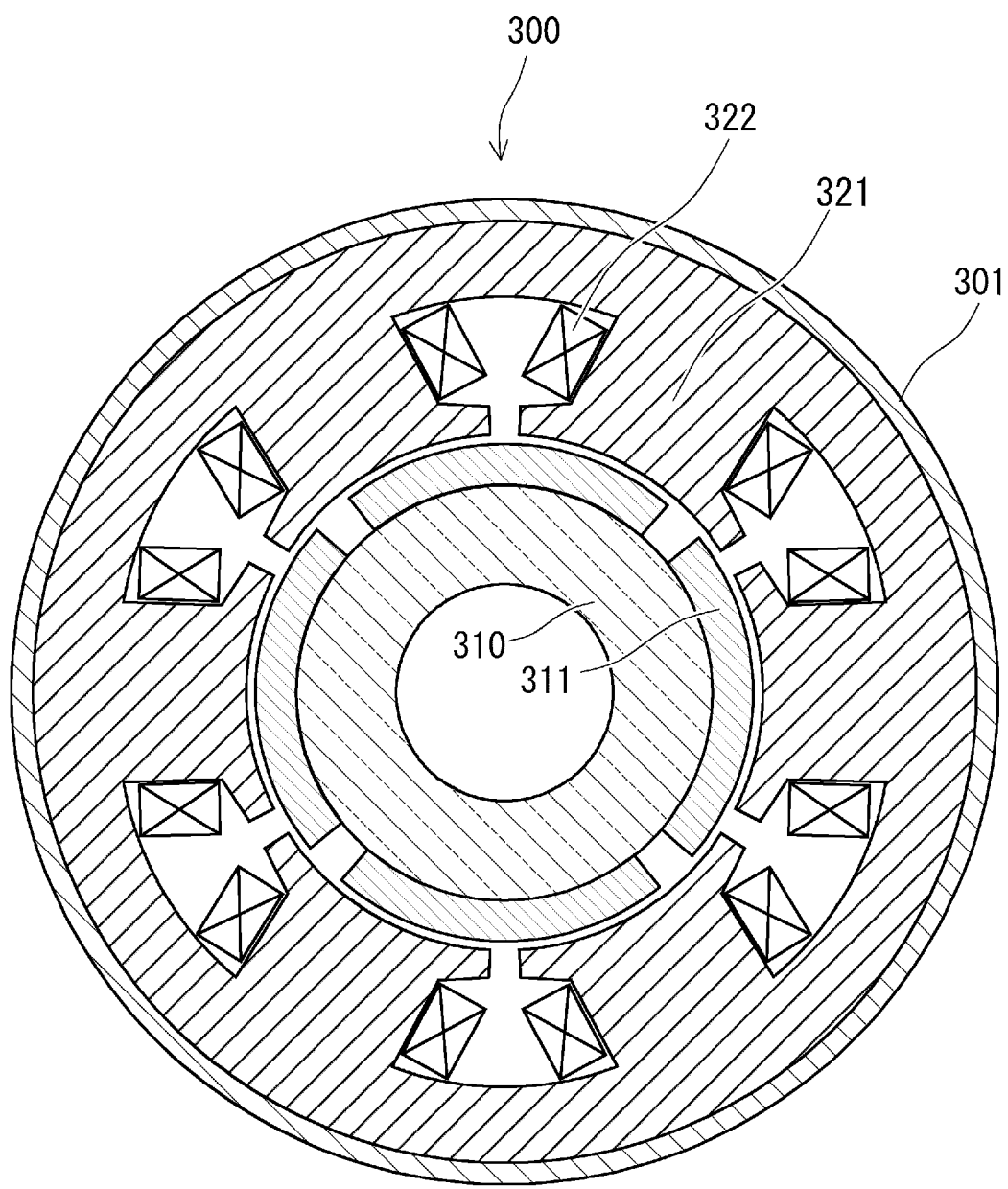
FIG. 4 is a cross-cross-sectional view of the motor according to the first embodiment.

Next, an example of the configuration of the first motor 300 will be described with reference to FIGS. 3 and 4. FIG. 3 is a drawing for explaining a configuration of a motor according to the first embodiment. FIG. 4 is a cross-sectional view of the motor according to the first embodiment. FIG. 4 shows a cross section taken along a line IV-IV in FIG. 3.

The first motor 300 is a synchronous motor in which a rotor is rotated by a surrounding rotating magnetic field generated by an alternating current. A purpose of this embodiment is to provide a motor having a high torque and a high acceleration in an electric injection molding machine. Therefore, the first motor 300 is preferably a synchronous motor. The first motor 300, which is shown as an example in FIGS. 3 and 4, is a PM (Permanent Magnet) motor including a permanent magnet(s) in its rotor 310. The first motor 300 mainly includes a rotor 310 serving as a rotation shaft, a stator 320 disposed around the rotor 310, and a case (or a housing) 301 supporting the rotor 310 and the stator 320. Note that in the first motor 300 shown in FIGS. 3 and 4, only the main configuration of the first motor 300 is shown and details of the configuration are omitted as appropriate. The details of the configuration are apparent to those skilled in the art.

The rotor 310 includes a plurality of permanent magnets 311 that generates a rotational force according to a magnetic field generated by a coil of the stator 320. Further, the rotor 310 includes a driving-side connection part 312 for connecting a ball screw 200 at one end of the rotor 310 and a motor connection part 313 for connecting the second motor 400 at the other end thereof. Further, the rotor 310 has a hollow structure. The rotor 310 is formed by, for example, stacking a plurality of electromagnetic steel plates. The rotor 310 is supported by the case 301 with a bearing 302 interposed therebetween.

The driving-side connection part 312 is engaged with a driven-side connection part 210 of the ball screw 200. The driving-side connection part 312 and the driven-side connection part 210 are configured so that when they are engaged with each other, they are firmly fixed to each other and hence they do not rattle. Further, they are configured to rotate about a common rotation shaft C in an interlocking manner. The driving-side connection part 312 and the driven-side connection part 210 have a male/female relation therebetween, and have a rotation prevention structure. In the example shown in FIG. 3, the driven-side connection part 210 is formed as a spline-shaped shaft and the driving-side connection part 312 is formed as a spline-shaped hole which conforms to the spline shape of the driven-side connection part 210. Note that the shape of the connection part is not limited to the spline shape. For example, the connection part may have serrations, a D-cut shape, or the like.

The motor connection part 313 has a shape for connecting to the second motor 400. That is, the motor connection part 313 connects the second motor 400 to the first motor 300 coaxially with the ball screw 200 so that the first and second motors 300 and 400 drive the ball screw 200 in an interlocking manner. Further, the motor connection part 313 has a structure by which the second motor 400 can be detached from the motor connection part 313 after being connected thereto. That is, the second motor 400 is attachable/detachable in the electric injection molding machine 1.

The motor connection part 313 may have, for example, the same shape as that of the driven-side connection part 210 of the ball screw 200. In this case, the first motor 300 includes the driving-side connection part 312 at one end of the rotor 310 and the motor connection part 313, which has a shape by which it can be engaged with the driving-side connection part 312, at the other end of the rotor 310. By adopting such a structure, the first and second motors 300 and 400 can be connected to each other. In this case, the first and second motors 300 and 400 may be the same type of the motors.

The stator 320 is disposed around the rotor, and includes a plurality of teeth 321 and a coil 322 wound around the plurality of teeth 321. The teeth 321 are formed by, for example, stacking a plurality of electromagnetic steel plates. Further, the coil 322 is formed by, for example, winding a conductive wire (e.g., a lead) a number of times.

Note that the first motor 300 shown in FIGS. 3 and 4 is a mere example of the synchronous motor. That is, in the first motor according to the embodiment, the number of magnets included in the rotor, the number of teeth included in the stator, the number of times of winding of the coil, the number of phases of the coil, and the like may be changed in various ways. Further, the first motor 300 may be an SPM (Surface Permanent Magnet) motor in which magnets are incorporated (i.e., arranged) in the surface of the rotor, or an IPM (Interior permanent Magnet) motor in which magnets are incorporated (i.e., arranged) inside the rotor. Alternatively, the first motor 300 may be a reluctance motor in which no magnet is incorporated (i.e., disposed) in the rotor.

Figure 5:
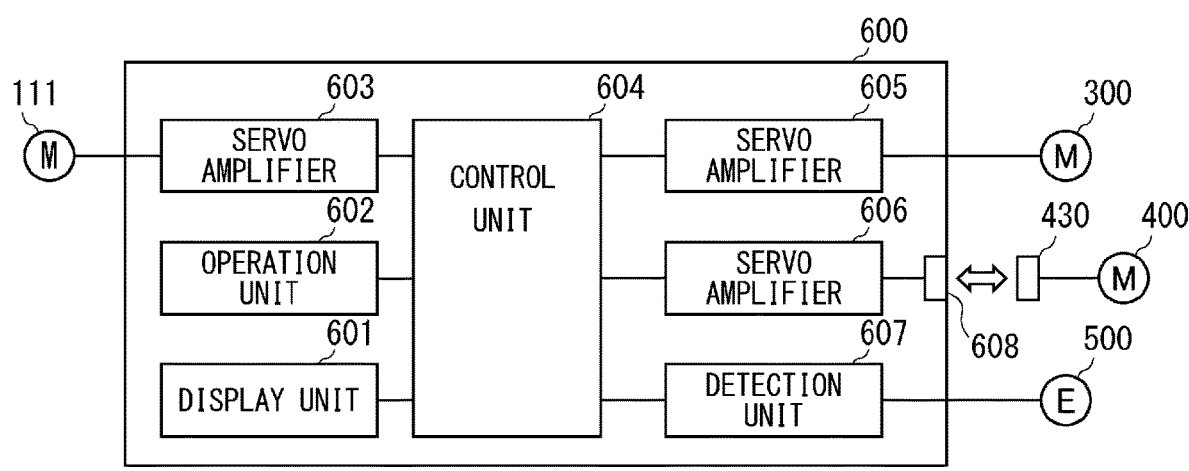
FIG. 5 is a block diagram of a control apparatus according to the first embodiment.

Next, the control apparatus 600 will be described with reference to FIG. 5. FIG. 5 is a block diagram of the control apparatus according to the first embodiment. The control apparatus 600 includes a display unit 601, an operation unit 602, a servo amplifier 603, a control unit 604, a servo amplifier 605, a servo amplifier 606, a detection unit 607, and a connector 608. Note that the electric injection molding machine 1 may include a mold clamping unit (not shown) for opening and closing the mold, and a temperature control apparatus (not shown) for controlling the temperature of the resin or/and the mold. In this embodiment, the mold clamping unit and the temperature control apparatus are formed by using known techniques. Therefore, their explanations are omitted in the present disclosure. The control apparatus 600 may have a function of controlling these components of which explanations are omitted.

The display unit 601 is a liquid crystal display apparatus including, for example, a display controller, and displays information when a user performs various operations. The operation unit 602 is an input device for enabling a user to perform various input operations. For example, the operation unit 602 may include buttons or may be a touch panel. The display unit 601 and the operation unit 602 are connected to the control unit 604, and receive various types of signals or output various types of information through the control unit 604.

The servo amplifier 603 receives an instruction from the control unit 604, and outputs an electric current for driving the plasticizing motor 111 based on the received instruction.

The control unit 604 is connected to each component of the control apparatus 600 and controls the operation of the electric injection molding machine 1. The control unit 604 includes, for example, a circuit board in which a CPU (Central Processing Unit) and a memory are mounted. When the second motor 400 is connected to the electric injection molding machine 1, the control unit 604 sends an instruction(s) for an interlocking operation to the servo amplifiers 605 and 606. As a result, the first and second motors 300 and 400 drive the ball screw 200 in an interlocking manner.

The servo amplifier 605 receives an instruction from the control unit 604 and outputs an electric current for driving the first motor 300 based on the received instruction.

The servo amplifier 606 receives an instruction from the control unit 604 and outputs an electric current for driving the second motor 400 based on the received instruction. The servo amplifier 606 is connected to the connector 608. The connector 608 can be detachably connected to a connector 430. The connector 430 is connected to the second motor 400.

The detection unit 607 is connected to the encoder 500, and provides data relating to the rotation of the first motor detected by the encoder 500 to the control unit 604. Note that the encoder 500 may be connected to the servo amplifier 605 or 606 through the control unit 604, or may be directly connected to the servo amplifiers 605 and 606 without the control unit 604 intervened therebetween.

Figure 6:
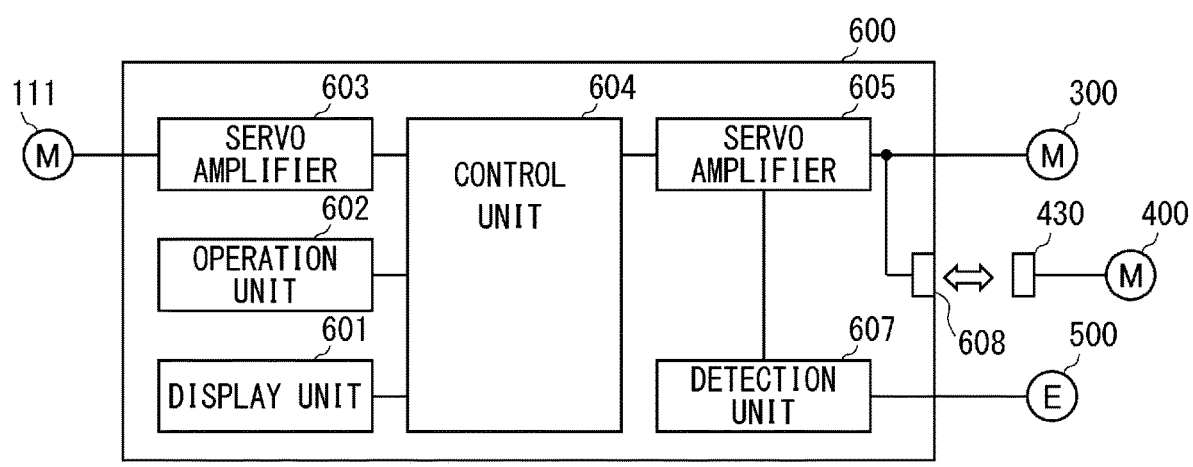
FIG. 6 is a block diagram showing another example of the control apparatus according to the first embodiment.

Next, another example of the control apparatus 600 will be described with reference to FIG. 6. FIG. 6 is a block diagram showing another example of the control apparatus according to the first embodiment. The example shown in FIG. 6 differs from the control apparatus 600 shown in FIG. 5 because the servo amplifier 605, which operates the first motor 300, also has a function of operating the second motor 400. By the above-described configuration, the control apparatus 600 can operate the first and second motors 300 and 400 in synchronization with each other in an interlocking manner by using one servo amplifier. Note that in FIGS. 5 and 6, the second motor 400 may include the encoder 501 shown in FIG. 1. In this case, the control apparatus 600 can control the first and second motors 300 and 400 by using one or both of the signals received from the encoders 500 and 501. That is, the control unit 604 may be connected to the encoder 501 and control the first and second motors 300 and 400 based on the signal received from the encoder 501. Alternatively, the control unit 604 may acquire both of the signals from the encoders 500 and 501, generate a composite signal from the acquired signals by a predetermined method, and control the first and second motors 300 and 400 based on the generated composite signal. Note that the predetermined method is, for example, to combine the signals by adding, multiplying, or averaging the signals.

As described above, in the electric injection molding machine 1 according to the first embodiment, it is possible to connect the second motor 400, which drives the ball screw 200 in an interlocking manner with the first motor 300, to the first motor 300. In this way, the electric injection molding machine 1 can suitably set a torque with which the ball screw 200 is driven, and a response property thereof. That is, according to the first embodiment, it is possible to provide an electric injection molding machine including a motor having a high degree of flexibility in design, and having a high torque and a low inertia.

Second Embodiment

Next, a second embodiment will be described. The second embodiment differs from the first embodiment because the second motor 400 is in a connected state.

Figure 7:
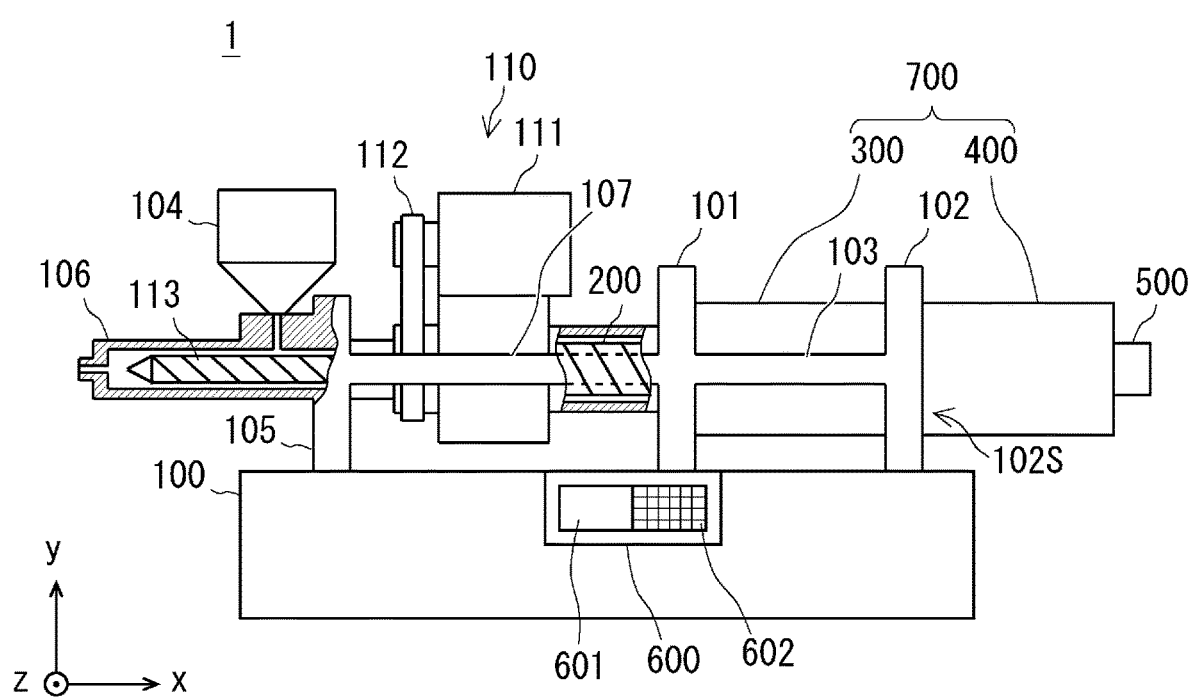
FIG. 7 is an overall view of an electric injection molding machine according to a second embodiment.

Firstly, an example where the first and second motors 300 and 400 are connected to each other will be described with reference to FIG. 7. FIG. 7 is an overall view of an electric injection molding machine 2 according to the second embodiment.

In FIG. 7, the electric injection molding machine 2 includes a second motor 400 and an encoder 500 in addition to the components of the electric injection molding machine 1 according to the first embodiment. The second motor 400 is fixed in the surface 102S of the second fixing plate 102. That is, the electric injection molding machine 2 includes the first fixing plate 101 for fixing the first motor 300 and the second fixing plate 102 for fixing the second motor 400. Further, the electric injection molding machine 2 includes the beam member 103 that bridges the first and second fixing plates 101 and 102.

In the electric injection molding machine 2, the first and second motors 300 and 400 may be collectively referred to as a driving apparatus 700. The driving apparatus 700 includes a plurality of motors and the plurality of motors drive the ball screw 200 in an interlocking manner. The encoder 500 is directly or indirectly engaged with the rotor of the motor and detects the number of revolutions (e.g., revolutions per minute) of the engaged rotor.

Figure 8:
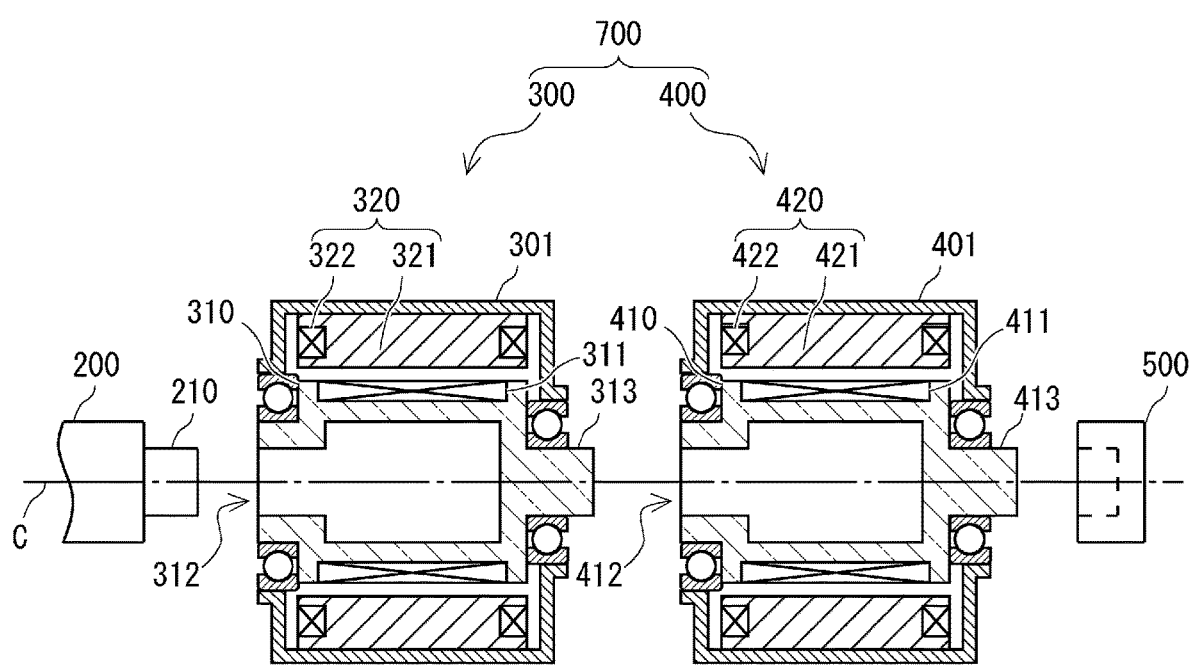
FIG. 8 is a drawing for explaining a configuration of a driving apparatus according to the second embodiment.

Next, a configuration of the driving apparatus 700 will be described with reference to FIG. 8. FIG. 8 is a drawing for explaining the configuration of the driving apparatus according to the second embodiment.

The driving apparatus 700 includes the first and second motors 300 and 400. A purpose of this embodiment is to provide a motor having a high torque and a high acceleration in an electric injection molding machine. Therefore, each of the first and second motors 300 and 400 is preferably a synchronous motor in which a rotor is rotated by a surrounding rotating magnetic field generated by an alternating current. The first motor 300 has the same configuration as that described above with reference to FIG. 3. Further, the second motor 400 has the same configuration as that of the first motor 300. That is, the second motor 400 is a PM motor, and mainly includes a rotor 410, a stator 420, and a case 401. The number of poles of the magnet and the stacking thickness of the iron core of the rotor of the first motor 300 are equal to those of the second motor 400. Further, the number of phases and the number of slots of the coil of the first motor 300 are equal to those of the second motor 400. Note that each of the first and second motors 300 and 400 may be an SPM motor in which magnets are incorporated (i.e., arranged) in the surface of the rotor, or an IPM motor in which magnets are incorporated (i.e., arranged) inside the rotor. Further, each of the first motor 300 and the second motor 400 may be a reluctance motor in which no magnet is incorporated (i.e., disposed) in the rotor.

The motor connection part 313 of the first motor is connected to the driving-side connection part 412 of the second motor 400. Further, the driving-side connection part 312 of the rotor 310 is connected to the driven-side connection part 210 of the ball screw 200. Therefore, the rotors 310 and 410 are connected to each other coaxially with the rotation shaft C of the ball screw 200, and drive the ball screw 200 in an interlocking manner.

The second motor 400 includes a motor connection part 413 on a side of the second motor 400 opposite to the driving-side connection part 412 connected to the first motor 300. An encoder 500 is connected to the motor connection part 413. The encoder 500 detects (i.e., obtains) data relating to the rotation speed of the driving apparatus 700, and provides the obtained data relating to the detected number of revolutions to the servo amplifier of the driving apparatus 700. That is, the servo amplifier of the driving apparatus 700 uses the same signals that are received from the encoder 500 and originally used to control the first and second motors 300 and 400, respectively. In other words, the control apparatus 600 controls the plurality of motors included in the driving apparatus 700 by using the signals received from the encoder 500. The control apparatus 600 of the electric injection molding machine 2 drives the first and second motors 300 and 400 while synchronizing electric currents supplied to the coils 322 and 422 of the first and second motors 300 and 400.

Note that the number of motors provided in the driving apparatus 700 is not limited to two. That is, the driving apparatus 700 may have three or more motors, and may have a configuration in which these three or more motors are connected to one another coaxially with the rotation axis C of the ball screw 200 and drive the ball screw 200 in an interlocking manner. In such a case, the electric injection molding machine 2 includes a plurality of fixing plates for fixing a plurality of motors, and has a configuration in which each of the fixing plates fixes a respective one of the motors. Further, the electric injection molding machine 2 may include a beam member(s) that bridges (i.e., bridges the gap(s) between) the plurality of fixing plates.

As described above, the electric injection molding machine 2 according to the second embodiment includes the driving apparatus 700 including the plurality of motors. In this way, the electric injection molding machine 2 can suitably set a torque with which the ball screw 200 is driven, and a response property thereof. That is, according to the second embodiment, it is possible to provide an electric injection molding machine including a motor having a high degree of flexibility in design, and having a high torque and a low inertia.

Note that the present invention is not limited to the above-described embodiments and they can be modified as desired without departing from the spirit and scope of the present invention.

This application is based upon and claims the benefit of priority from Japanese patent application No. 2018-034582, filed on Feb. 28, 2018, the disclosure of which is incorporated herein in its entirety by reference.

REFERENCE SIGNS LIST 1, 2 ELECTRIC INJECTION MOLDING MACHINES
100 BASE
101 FIRST FIXING PLATE
102 SECOND FIXING PLATE
103 BEAM MEMBER
104 HOPPER
105 INJECTION APPARATUS SUPPORTING PART
106 CYLINDER
107 GUIDE MEMBER
110 INJECTION APPARATUS
111 PLASTICIZATION MOTOR
112 BELT
113 SCREW
210 DRIVEN-SIDE CONNECTION PART
300 FIRST MOTOR
301, 401 CASE
302 BEARING
310, 410 ROTOR
311, 411 PERMANENT MAGNET
312, 412 DRIVING-SIDE CONNECTION PART
313, 413 MOTOR CONNECTION PART

320, 420 STATOR
321, 421 TEETH
322, 422 COIL
400 SECOND MOTOR
430 CONNECTOR
500, 501 ENCODER
600 CONTROL APPARATUS
601 DISPLAY UNIT
602 OPERATION UNIT
603 SERVO AMPLIFIER
604 CONTROL UNIT
605 SERVO AMPLIFIER
606 SERVO AMPLIFIER
607 DETECTION UNIT
608 CONNECTOR
700 DRIVING APPARATUS

The invention claimed is:

1. An electric injection molding machine comprising:
a base;
an injection apparatus supported by the base and comprising a screw configured to inject a resin;
a driving direction conversion part configured to move the injection apparatus forward and backward in an axial direction of the screw;
a stand-alone support structure including a first support member connected to a second support member via a connecting beam, the stand-alone support structure being configured to be attached to the base via the first and second support members; and
a first motor coaxially connected to a rotation shaft of the driving direction conversion part through the first support member of the support structure, the first motor being configured to drive the driving direction conversion part,
wherein
the first motor comprises a motor connection part, the motor connection part being configured to connect a second motor to the first motor coaxially with the rotation shaft through the second support member of the support structure on a side of the first motor opposite to a side thereof on which the driving direction conversion part is connected thereto, the second motor being configured to drive the driving direction conversion part in an interlocking manner with the first motor,
the first motor is configured to be attached to the first support member on a side of the first motor on which the driving direction conversion part is provided, and
the second motor being configured to be attached to the second support member on a side of the first motor on which the motor connection part is provided.

2. The electric injection molding machine according to claim 1, wherein the motor connection part has a structure by which the second motor can be detached from the motor connection part after being connected thereto.

3. The electric injection molding machine according to claim 1, further comprising a control apparatus comprising a servo amplifier configured to drive the first motor, wherein
the control apparatus comprises a second motor driving connector configured to drive the first and second motors in an interlocking manner.

4. The electric injection molding machine according to claim 3, further comprising an encoder configured to detect the number of revolutions of the first or second motor, wherein
the control apparatus controls the first and second motors by using a signal received from the encoder.

* * * * *